Oct. 25, 1938.   W. D. COHEA ET AL   2,134,073
SHAFT STRAIGHTENER
Filed Oct. 5, 1937

Inventors
Wayne D. Cohea,
John R. Cohea,

By Clarence A. O'Brien
Hyman Berman
Attorneys

Patented Oct. 25, 1938

2,134,073

UNITED STATES PATENT OFFICE 2,134,073

SHAFT STRAIGHTENER

Wayne D. Cohea and John R. Cohea, Frederick, Okla.

Application October 5, 1937, Serial No. 167,476

1 Claim. (Cl. 153—52)

This invention relates to machinists' or mechanics' implements for straightening shafts and shafting, and, more specifically stated, consists in an implement of this character which is especially adapted for use on a lathe to be used in conjunction therewith for straightening the rod or shaft as the same is being rotated by the lathe.

The invention together with its objects and advantages will be best understood from a study of the following description taken in connection with the accompanying drawing wherein—

Figure 1:
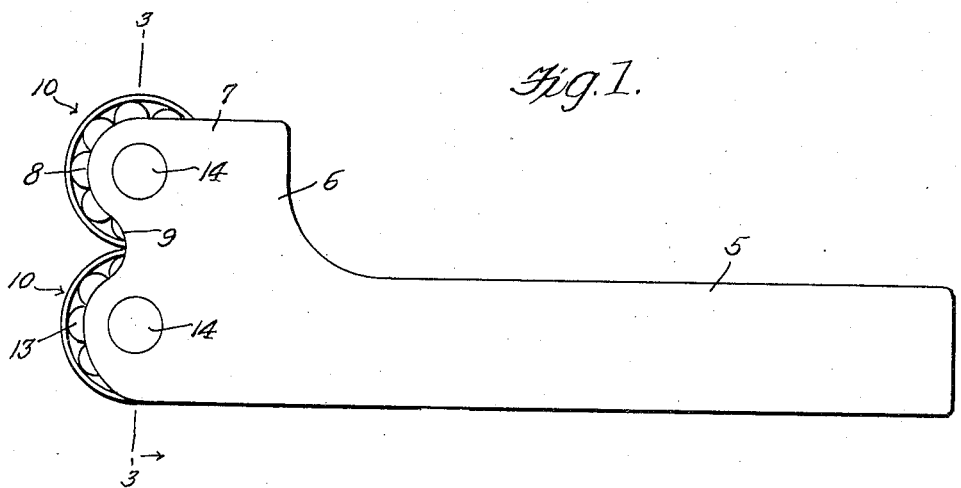
Figure 1 is a side elevational view of the device.

Referring to the drawing by reference numerals it will be seen that in a preferred embodiment thereof the shaft straightener comprises a shank 5 of a size and shape to be accommodated in the usually provided vertical slot of the vertical post of a tool holder forming part of a lathe equipment and more particularly to that type of tool holder which is mounted on the lathe between the centers thereof so that the tool may be properly brought into engagement with the work held between the centers of the lathe.

Figure 2:
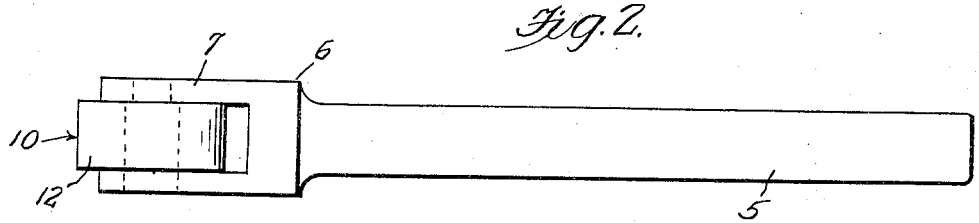
Figure 2 is a top plan thereof.

At one end thereof the shank 5 is provided with an enlarged head 6 that includes a pair of spaced parallel side plates 7 the free vertical edges of which, as shown in Figure 2, are convex at the upper and lower ends thereof as at 8 and concave intermediate said ends as at 9.

Journaled between the side plates 7 of head 6 are work-engaging rollers 10.

Each roller 10 includes an inner race 11 and an outer race 12 between which are balls or anti-friction elements 13.

Figure 3:
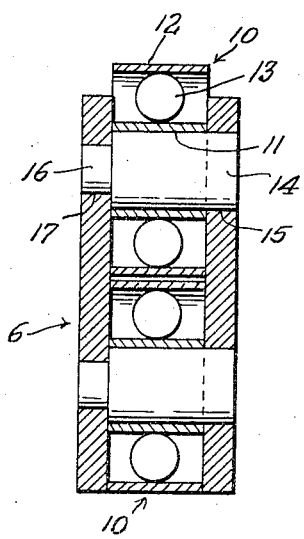
Figure 3 is a sectional view taken substantially on the line 3—3 of Figure 1.

Also each roller is supported by a pivot pin or stub shaft 14 that has one end fitting snugly in an enlarged opening 15 in one side plate 7 and has a materially reduced end 16 fitting snugly in a relatively smaller opening 17 in the opposite side plate 7 as clearly shown in Figure 3.

The periphery of the rollers 10 projects beyond the free longitudinal edges of the side plates 7 as shown in Figures 1 and 2, so as to peripherally engage the rod or shaft to be straightened.

In using the device the shaft to be straightened is placed in the lathe between the centers thereof, or where such a type of lathe is used the shaft or rod is placed in the chuck and center rest, so that the shaft will be properly supported and rotated. Heat is applied to the bent portion of the rod or shaft while the same is turning. The shank part of the tool is placed in the holder post of the lathe and the post adjusted in the usual manner to bring the rollers 10 against the bent portion of the shaft and the rollers 10 are held in such contact until the rod or shaft has been straightened. The rollers 12 are maintained in rolling contact with the shaft until the metal thereof has set or cooled to a degree as will insure the maintenance of the straight form of the shaft which has been thus obtained.

An advantage of a tool of this character is that pressure can be applied to such an extent that a scratching or roughening of the surface of the rod or shaft will not thereby result, this being due to the fact that rollers 10 will rotate with the shaft. Thus the shaft or rod will maintain the desired polished surface thereof, when such a surface is desirable, as for accommodating a bearing or the like.

It is thought that a clear understanding of the construction, utility and advantages of a shaft straightener of this character will be had without a more detailed description.

Having thus described the invention what is claimed as new is:

A shaft straightening attachment for a lathe comprising a shank for engagement with the tool holder post of a lathe, an enlargement at one end of the shank extending from one side edge thereof, said enlargement and the adjacent end of the shank being of forked construction, a pair of rollers located between the prongs thereof and having portions projecting beyond the ends of the prongs, each roller comprising inner and outer races and anti-friction means between the races and pivot pins passing through the prongs and through the center races of the two rollers, each pin having a reduced end fitting in a hole in one prong and its larger end fitting in a hole in the opposite prong.

WAYNE D. COHEA.
JOHN R. COHEA.